Patented July 26, 1927.

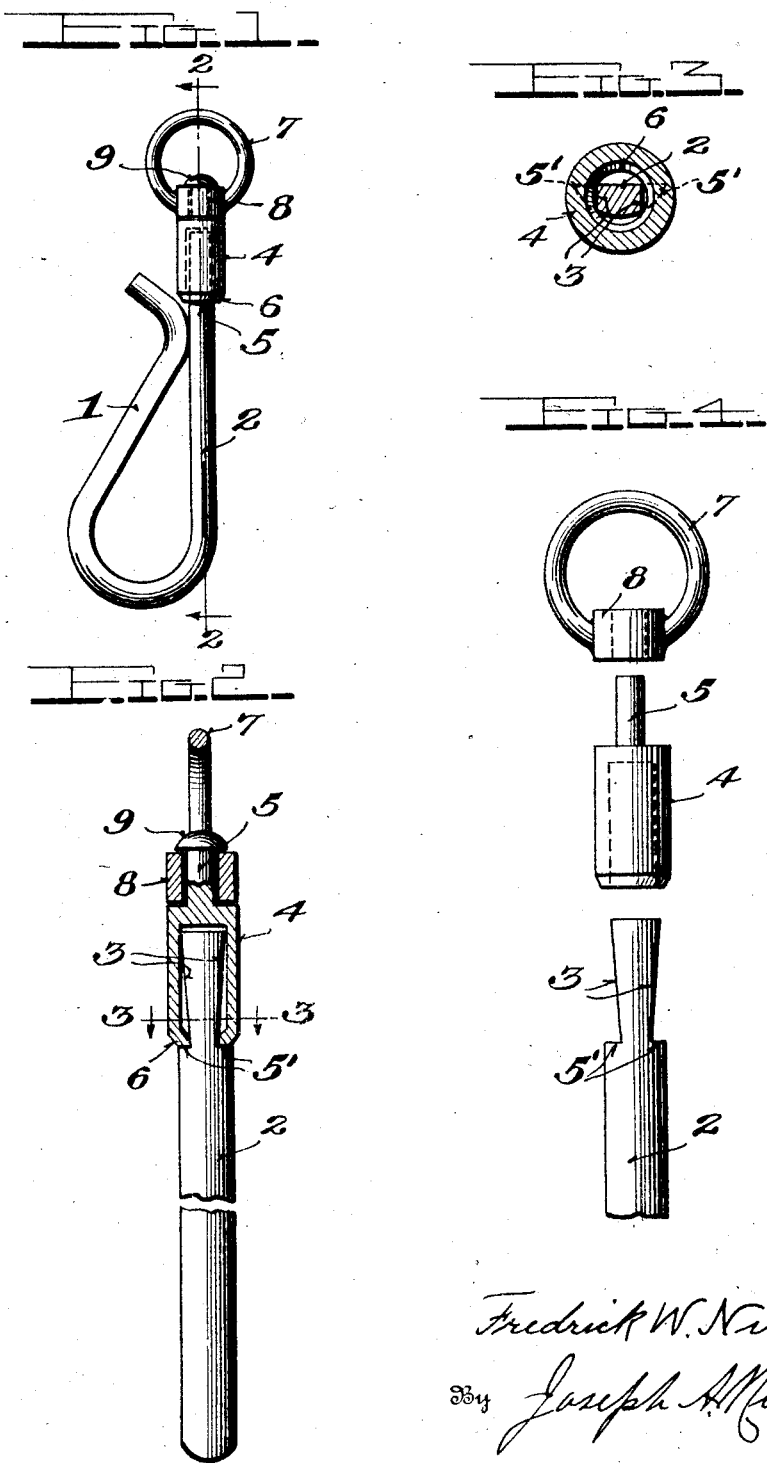

1,637,315

UNITED STATES PATENT OFFICE.

FREDRICK W. NITTEL, OF ATTLEBORO FALLS, MASSACHUSETTS, ASSIGNOR TO M S COMPANY, OF ATTLEBORO, MASSACHUSETTS.

HOOK.

Application filed March 19, 1927. Serial No. 176,626.

This invention relates to certain new and useful improvements in hooks, and pertains more particularly to a hook used in connection with keypocket-cases.

The primary object of the invention is to provide improved means for enabling the eye to be easily and quickly and swivelly connected to the hook.

In the drawings:—

Fig. 1 is a side elevation of the invention;
Fig. 2 is a section on line 2—2 of Fig. 1;
Fig. 3 is a like view on line 3—3 of Fig 2, and
Fig. 4 is a view showing the parts as related prior to assemblage.

In proceeding in accordance with the present invention a metal bar or strip is provided and which is bent to form a hook 1 and a shank 2. The free end of the shank has its opposite sides reduced as shown at 3, the reduced portions being flattened and preferably converging at their inner ends forming a part of non-circular cross-section.

The reduced portions may be formed by swaging or otherwise as may be desired. A sleeve 4 is provided with a stud 5 on one end thereof, the sleeve being received over the reduced portions 3 and seating against shoulders 5' resultant from the reduced portions. The base end of the sleeve is swaged inwardly at 6 so as to rigidly connect the sleeve to the shank of the hook. The swaging occurs at the extreme base or inner end of the sleeve so as to maintain accurate alignment of the sleeve with the shank 2. The usual ring 7 having a perforated hub 8 is then engaged over the stud 5 of the sleeve 4, whereupon the free end of the stud 5 is upset or headed as indicated at 9 so as to swivelly connect the ring to the sleeve.

From the foregoing it will be seen that the present invention enables the ring to be easily and quickly applied to the hook and at the same time to effectively connect the ring to the hook and against accidental separation of the parts.

It will also be seen that by the provision of a separate sleeve with a stud, as distinguished from the direct formation of a stud on the shank of the hook, a stronger structure is provided and one which affords a more secure and effective mounting for the stud, eliminating weakening of the shank as would occur were the stud formed on the latter. The sleeve moreover, considerably strengthens and reinforces the shank and affords a larger bearing for the hub of the ring in the swivelling action of the latter.

Having thus described my invention what I claim as new and desire to secure by Letters Patent is:—

1. In a hook, a shank having an end of non-circular cross-section, a sleeve swaged over the said end of the shank and having a stud projecting outwardly from its opposite end, and a ring swivelled on the stud.

2. A hook having a shank, a sleeve rigidly secured to and over the free end of the shank and having a closed end formed with an integral stud of less diameter than that of the sleeve, the stud projecting outwardly from said closed end of the sleeve, and a ring having a perforated hub which latter receives the stud and rotatably seats on the closed end of the sleeve, the free end of the stud being headed to engage the hub and hold same onto the stud.

3. A hook having a shank formed with opposite reduced portions which converge at their ends and form shoulders, a sleeve secured over the shank and having its inner end extending inwardly to seat on the shoulders and against the reduced portions, said sleeve having a closed end formed with an integral stud of less diameter than that of the sleeve the stud projecting outwardly from said closed end of the sleeve, and a ring having a perforated hub which latter receives the stud and rotatably seats on the closed end of the sleeve, the free end of the stud being headed to engage the hub and hold same onto the stud.

4. A hook having a shank, a sleeve rigidly secured to and over the free end of the shank, a stud projecting outwardly from the outer end of the sleeve, a ring having a perforated hub which latter receives the stud and rotatably seats on said outer end of the sleeve, the free end of the stud being headed to engage the hub to hold same onto the stud.

In testimony whereof I have signed my name to this specification.

FREDRICK W. NITTEL.